US005920684A

United States Patent [19]

Hastings et al.

[11] Patent Number: 5,920,684

[45] Date of Patent: Jul. 6, 1999

[54] HAND-HELD LABEL PRINTER WITH DEDICATED FUNCTION KEYS FOR CREATING AND ALTERING LABELS

[75] Inventors: Nicholas James Hastings, Cottenham; Graham Scott Gutsell, Harston; Ian Morgan George, Cambridge; Martin Christopher Edwards, West Ratting, all of United Kingdom

[73] Assignee: Esselte N.V., Belgium

[21] Appl. No.: 08/867,517

[22] Filed: Jun. 2, 1997

[30] Foreign Application Priority Data

Jul. 5, 1996 [GB] United Kingdom .................. 9614144

[51] Int. Cl.[6] ............................ G09G 5/00; G06K 15/00

[52] U.S. Cl. ......................... 395/112; 395/117; 345/168; 345/169

[58] Field of Search .................................... 395/101–117; 382/254–275; 358/443, 445–460, 528, 530–38; 345/168–169

[56] References Cited

U.S. PATENT DOCUMENTS

| | | | |
|---|---|---|---|
| 5,287,445 | 2/1994 | Kataoka et al. | 395/148 |
| 5,288,155 | 2/1994 | Suzuki | 395/117 |
| 5,289,573 | 2/1994 | Kataoka et al. | 395/156 |
| 5,363,480 | 11/1994 | Usami et al. | 395/145 |
| 5,480,246 | 1/1996 | Morimoto | 400/615.2 |
| 5,503,482 | 4/1996 | Kawakami et al. | 400/83 |
| 5,559,934 | 9/1996 | Ogura et al. | 400/83 |
| 5,562,353 | 10/1996 | Handa et al. | 400/813.2 |
| 5,651,619 | 7/1997 | Nunokawa et al. | 400/83 |
| 5,737,504 | 4/1998 | Yamada | 395/117 |
| 5,765,041 | 5/1996 | Cherichetti et al. | 395/872 |
| 5,810,486 | 9/1998 | Hayama et al. | 400/61 |

FOREIGN PATENT DOCUMENTS

| | | | |
|---|---|---|---|
| 424 052 A2 | 10/1990 | European Pat. Off. | G06K 15/02 |
| 0 440 510 | 8/1991 | European Pat. Off. | G06F 15/20 |
| 650 841 A2 | 2/1994 | European Pat. Off. | B41J 3/407 |
| 0 600 593 | 6/1994 | European Pat. Off. | G06K 15/00 |
| 0 650 841 | 5/1995 | European Pat. Off. | B41J 3/407 |
| 0 726 533 A2 | 1/1996 | European Pat. Off. . | |
| 726 533 A2 | 1/1996 | European Pat. Off. | G06F 17/21 |
| 0 695 643 | 2/1996 | European Pat. Off. | B41J 21/00 |
| 0 745 487 | 4/1996 | European Pat. Off. | B41J 3/36 |
| 7-214860 | 1/1994 | Japan | B41J 21/00 |
| 7-200556 | 4/1995 | Japan | G06F 17/21 |
| 7-200580 | 4/1995 | Japan | G06F 17/24 |
| WO 83/00461 | 8/1982 | WIPO | B41J 3/38 |
| WO 92/09438 | 12/1991 | WIPO | B41J 2/485 |
| WO 96/16813 | 12/1995 | WIPO | B41J 3/36 |

*Primary Examiner*—Scott Rogers
*Assistant Examiner*—Lance W. Sealey
*Attorney, Agent, or Firm*—Pennie & Edmonds LLP

[57] ABSTRACT

A label printer having a plurality of input keys for inputting data defining a label image to be printed on an image receiving medium. The input keys include a plurality of data entry keys for entering character data and a plurality of function keys for use in controlling printing of the character data. The label printer includes a display area for displaying information relating to a label image to be printed, a printing unit for printing the label image and a controller for controlling operation of the label printer and including addressing unit for addressing the display area. The display area comprises first and second display zones, each being selectively addressable by the addressing unit to display information relating to the label image. The first display zone is addressable to display a plurality of editing options in relation to each function key. The second display zone is addressable to display prestored selectable data corresponding to each editing option in relation to a function key actuated to thereby assist a user in defining a label.

22 Claims, 12 Drawing Sheets

HAND-HELD LABEL PRINTER WITH DEDICATED FUNCTION KEYS FOR CREATING AND ALTERING LABELS

FIELD OF THE INVENTION

The present invention relates to a printing apparatus and, in particular but not exclusively, is concerned with a tape printing apparatus.

BACKGROUND OF THE INVENTION

Known tape printing apparatus of the type with which the present invention is generally concerned are disclosed in EP-A-322918 and EP-A-322919 (Brother Kogyo Kabushiki Kaisha) and EP-A-267890 (Varitronics). The printers each include a printing device having a cassette receiving bay for receiving a cassette or tape holding case. In EP-A-0267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double-sided adhesive tape which is secured at one of its adhesive coated sides to the image tape after printing and which has a backing layer peelable from its other adhesive coated side. With both these apparatus, the image transfer medium, such as an ink ribbon, and the image receiving tape, such as a substrate, are in the same cassette.

There is a different type of tape printing apparatus which is described for example in EP-A-578372, the contents of which are herein incorporated by reference. In this printing apparatus, the substrate tape is similar to that described in EP-A-267890 but is housed in its own tape holding case while the ink ribbon is similarly housed in its own tape holding case.

In all of these apparatus, the image receiving tape passes in overlap with the ink ribbon to a print zone consisting of a fixed print head and a platen. The print head can be pressed against the platen to cause an image to transfer from the ink ribbon to the image receiving tape. There are many ways doing this, including dry lettering or dry film impression, but the most usual way at present is by thermal printing where the print head is heated and the heat causes ink from the ink ribbon to be transferred to the image receiving tape. Alternatively, the print head may be in direct contact with a thermally sensitive image receiving tape whereby when the print head is heated, an image is defined on the image receiving tape.

Tape printing apparatus or label printers are generally designed to be handheld or small desktop apparatus. Such apparatus are generally provided with an increasing number of different functions and options. However, the number of keys available for selecting these functions and options is limited by the compact nature of these products. At the present, individual functions, such as character size or font are selected by activation of a dedicated key. The number of functions available in this way can be increased by the use of shift keys. However, this can make the setting or selecting of the various functions complicated, particularly if there are a large number of functions or options to be selected. This can be a time consuming process. Additionally, it may be difficult for the user to clearly determine what options are available and indeed what values have been selected for a given option.

SUMMARY OF THE INVENTION

The present invention relates to a label printer comprising a plurality of keys for entering data defining a label image to be printed on an image receiving medium. A display area is provided on the label printer for displaying information relating to the label image and including first and second zones. The label printer further comprises printing means for printing the label image and control means for controlling the operation of the label printer to selectively operate in a setup mode and an edit mode. In the label printer of the present invention, the first zone is adapted to display information responsive to the actuation of at least one of the keys. The second zone is adapted to display, in the setup mode, a set of prestored selectable data corresponding to the information displayed in the first display zone to thereby assist a user in defining a label.

According to the label printer of the present invention, the keys comprise a plurality of data entry keys for entering character data and a plurality of function keys for editing character data entered. In the setup mode the first zone displays a plurality of different parameters in relation to a function key actuated and the second zone displays a set of selectable values associated with at least one parameter. In the edit mode the display area, which includes both the first and second zones, displays information relating to character data entered to define the image to be printed. Alternatively, only the first zone displays character data defining the image to be printed, in the edit mode.

In the label printer of the present invention, a line is provided in the display area to divide the first and second zones. This line may be displayed in the display area or may be superimposed on the display. Alternatively the first and second zones may be defined by separate displays. In this way, it is clear to the user as to the distinction between the information in the first zone and the information in the second zone.

The label printer of the present invention further comprises a select key for selecting a value for a selected parameter. Such select key is actuated until the desired value for a parameter has been selected. For example, if there are four selectable values for a parameter, the select key would be actuated twice in order to select the third value. By using the same key to select different values for various different parameters, it is then much simpler for the user to use the label printer. The use of a single key as opposed to a set of keys such as a set of cursor keys is simpler and more convenient for the user.

According to the label printer of the present invention, the control means is arranged so that a function key, when being actuated in the setup mode, causes its associated parameters to be displayed in the display area and replace parameters in relation to a previously actuated function key. In this way, it is possible for a user to easily set the selectable values of parameters associated with more than one function key. The number of key strokes required to select a desired set of attributes or parameters may thereby be reduced. The control means is preferably arranged so that when the label printer is in the select mode information relating to a first function key is displayed.

In a preferred embodiment of the label printer of the present invention, the function keys include a symbol key associating with a plurality of symbol parameters. Each symbol parameter represents a sub set of related symbols. Such symbol key, when actuated, causes its associated symbol parameters to be displayed in the first zone. By dividing the symbols into sub sets containing related symbols, it may make it easier for the user to locate a particular symbol.

In another preferred embodiment of the label printer of the present invention, the function keys includes a memory key associated with a plurality of memory parameters. Such memory key, when actuated, causes its associated memory parameters to be displayed in the first zone. The second zone can be arranged to display information relating to the status of a selected memory parameter. The memory parameters may take the form of the number of labels stored in a memory and the percentage of memory available, which are helpful to prevent the memory from becoming overfull or the accidental over-writing of labels which are to be retained in the memory.

In a further preferred embodiment of the label printer of the present invention, information relating to the number of labels stored in the memory and the percentage of the memory available is displayed in the second zone.

In a further preferred embodiment of the label printer of the present invention, one of the parameters associated with one function key is a language parameter. The control means then is arranged to display information for the user in the language selected when such language parameter is selected. By having a large number of different languages, it is possible for users speaking a number of different languages to use the same machine.

In a further preferred embodiment of the label printer of the present invention, the parameters comprise at least one of the following attributes: character attributes; label attributes; bar code attributes; cutter attributes; memory attributes; and printing attributes.

According to the label printer of the present invention, at least one of the function keys causes parameters relating to character and label attributes to be displayed along with a sample character and label with at least one of the selected attributes. The sample character and label only have the attributes associated with the selected function key.

Preferably, a currently selected value for each of the plurality of parameters is displayed. In this way, the user can easily see what the parameters are and what values have been selected for those parameters. This may simplify the selection of values for a large number of parameters.

The label printer of the present invention further comprises a movable cursor. Such cursor is movable to designate one parameter, which is among the plurality of parameters displayed in the first zone upon the selection to an associated function key, to thereby display a set of prestored selectable values in relation to the parameter.

According to the present invention, each set of prestored selectable values in relation to a parameter consists of more than two options. For the type of parameters which can be either selected or not selected, they do not need to be displayed in the second zone of the display area as a set of prestored selectable values.

According to the present invention, the user is only able to address one of the first and second zones. Thus, a second zone of the display area is left free for information to be displayed. Such information may take the form of messages for the user or of options available to the user. The separation of the display area into two zones makes it easier for the user to distinguish between the information relating to the label image and the prestored selectable data relating to the information which may simplify the operation of the label printer.

When an edit and a setup modes are provided, better use can be made of the display area in that more of the display may be available for selecting values in relation to parameters of each function key. In a preferred embodiment of the present invention, a plurality of different parameters are to be displayed at one time. This can make it simpler for the user to select among the various parameters, particularly when the parameters are related, by reducing the number of key strokes required.

In addition, the select mode may be arranged so that the first zone displays menus. The second zone may display options for selection in the setup mode or characters defining an image to be printed in the edit mode of operation. The menu comprises a plurality of parameters, the values of which are selectable by the user and the options displayed are the possible selectable values for a given parameter. Thus, by having menus of the parameters in one zone and options for selection in another zone, it is then clear to the user as to which parameters are available and what the values are for those parameters.

In a preferred embodiment, the second zone only displays the selectable values for a highlighted parameter from the menu of parameters displayed in the first zone. It is thus possible for a user to easily select among selectable values for each desired parameter from the menu, which simplifies the operation of the label printer.

The present invention relates to a label printer comprising input means for inputting data defining a label image to be printed on an image receiving medium. The input means comprises a plurality of data entry keys for entering character data and a plurality of function keys for use in controlling printing of the character data. A display area is provided on the label printer for displaying information relating to a label image to be printed. The label printer of the present invention further comprises printing means for printing the label image and control means for controlling operation of the label printer to operate selectively in a select mode and an edit mode. In the label printer of the present invention, each function key is adapted, in the setup mode, to cause a plurality of different parameters in relation thereto to be displayed in the display area. Each of the plurality of parameters has associated therewith a set of prestored selectable values for defining the parameter. A selected parameter, its associated set of selectable values and a currently selected value for the parameter can be displayed at the same time in the display area. In the edit mode each data entry key is adapted to cause a character data in relation thereto to be displayed in the display area.

According to the label printer of the present invention, the display area comprises a first and a second zone. In the setup mode, the first zone is adapted to display the plurality of different parameters in relation to a function key actuated and the second zone is adapted to display the set of prestored selectable values associated with a selected parameter to assist a user in defining a label. The control means comprises addressing means for selectively addressing the first and the second zone to display information relating to the label image.

The present invention also relates to a label printer which comprises input means for inputting data defining a label image to be printed on an image receiving medium. The input means comprises a plurality of data entry keys for entering character data and a plurality of function keys for use in controlling printing of the character data. A display area is provided for displaying information relating to a label image to be printed. The label printer of the present invention further comprises printing means for printing the label image and control means for controlling operation of the label printer and including addressing means for addressing the display area. In the label printer, the display area comprises a first and a second display zone, each of which is selectively addressable by the addressing means to display information relating to the label image. The first display zone is addressable to display a plurality of editing options in relation to each function key. The second display zone is addressable to display prestored selectable data corresponding to each editing option in relation to a function key actuated to thereby assist a user in defining a label.

It should be appreciated that various features regarding the label printer of the present invention as discussed hereinabove can be associated herewith.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE PREFERRED EMBODIMENTS

Figure 1:
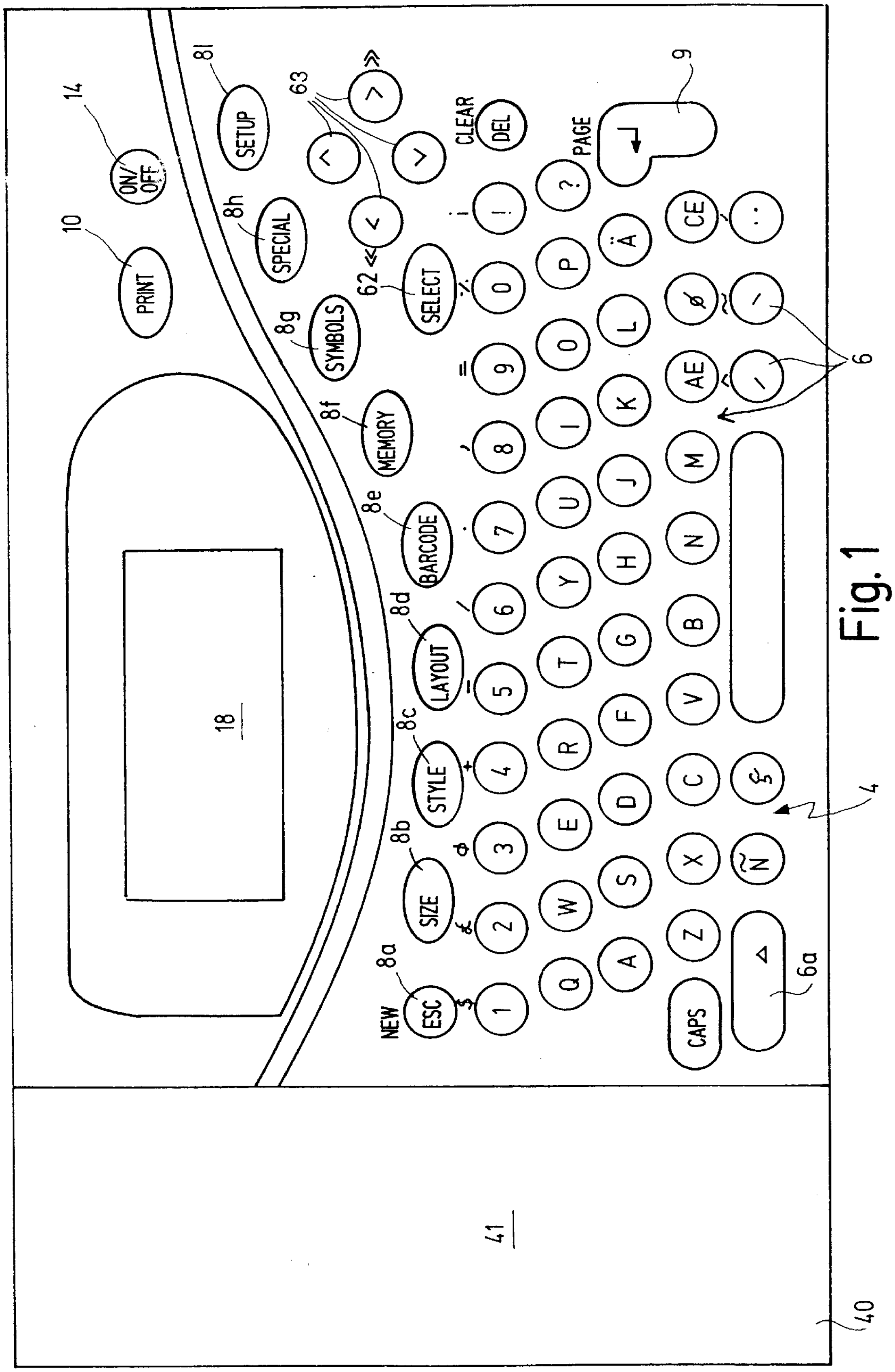
FIG. 1 is a plan view showing the front of a tape printing apparatus.

FIG. 1 shows a simplified plan view of a tape printing apparatus 2 of the present invention. The tape printing apparatus 2 comprises a keyboard 4. The keyboard 4 has a plurality of data entry keys and in particular comprises a plurality of number, letter and punctuation keys 6 for inputting data to be printed as a label and function keys 8*a*–8*i* for editing the input data. These function keys 8*a*–8*i* are arranged, for example, to change the size or font of the input data. Additionally, these function keys 8*a*–8*i* allow, amongst other functions, underlining and boxing of the label to be achieved. The functions associated with the function keys 8*a*–8*i* will be described in more detail hereinafter. The keyboard 4 also comprises a print key 10 which is operated when it is desired that a label be printed. Tape feeding keys (not shown) may be provided in some embodiments of the present invention. Additionally, the keyboard 4 has an on/off key 14 for switching the label printing apparatus 2 on and off.

The tape printing apparatus 2 also has a liquid crystal display (LCD) 18 which displays the data as it is entered. The display 18 allows the user to view all or part of the label to be printed which facilitates the editing of the label prior to its printing. As will be discussed in more detail hereinafter, the display is also arranged to display various editing options which are selectable by the user. Additionally, the display 18 can display messages to the user, for example, error messages or an indication that the print key 10 should be pressed or activated. The display 18 is driven by a display driver 28 which can be seen in FIG. 3.

Figure 2:
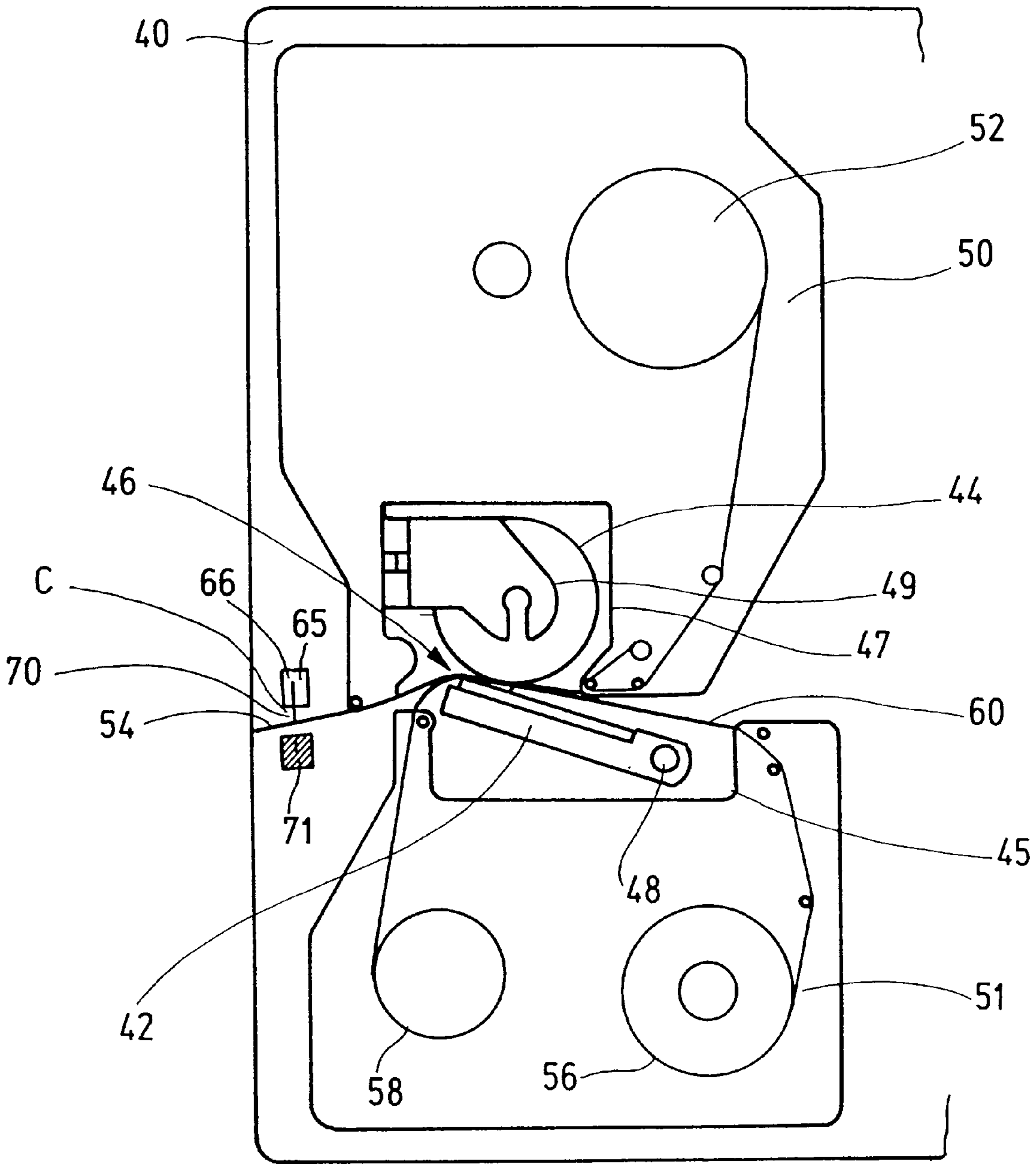
FIG. 2 is a plan view showing two cassettes inserted in the tape printing apparatus of FIG. 1.

Next to the keyboard 4 of the tape printing apparatus 2, there is a cassette receiving bay 40, which is normally closed with a lid 41. FIG. 2 shows the interior of the cassette receiving bay with the lid 41 removed. The cassette receiving bay 40 is arranged to receive two cassettes 50, 51, a thermal print head 42 and a platen 44 which cooperates to define a print zone 46. The platen 44 is mounted for rotation within a cage moulding 49. The print head 42 is pivotable about a pivot point 48 so that it can be brought into contact with the platen 44 for printing or moved away from the platen 44 to enable the cassettes 50, 51 to be removed and replaced. A cutting arrangement 66 is provided which includes a cutter support member 68 which carries a blade 70. The blade 70 acts against an anvil 71.

The first cassette inserted into the cassette bay 40 is denoted generally by reference numeral 50. This cassette 50 holds a supply spool 52 of an image receiving tape 54. The image receiving tape 54 comprises an upper layer for receiving a printed image on one of its surfaces and has its other surface coated with an adhesive layer to which is secured a releasable backing layer. The image receiving tape 54 is guided by a guide mechanism (not shown) through the cassette 50, out of the cassette 50 through an outlet o, past the print zone 46 to a cutting location C. The platen 44 is accommodated in a recess 47 of the first cassette 50.

The second cassette 51 has a supply of ink ribbon 60 on an ink ribbon supply spool 56 and an ink ribbon take up spool 58. The second cassette 51 also has a recess 45 for receiving the print head 42. The image receiving tape 54 and the ink ribbon 60 are arranged to pass in overlap between the print head 42 and the platen 44. In particular, the image receiving layer of the image receiving tape 54 is in contact with the ink ribbon 60. The ink ribbon 60 is a thermal transfer ribbon which when in contact with the activated or heated elements of the thermal print head 42 defines an image on the image receiving tape 54.

Figure 3:
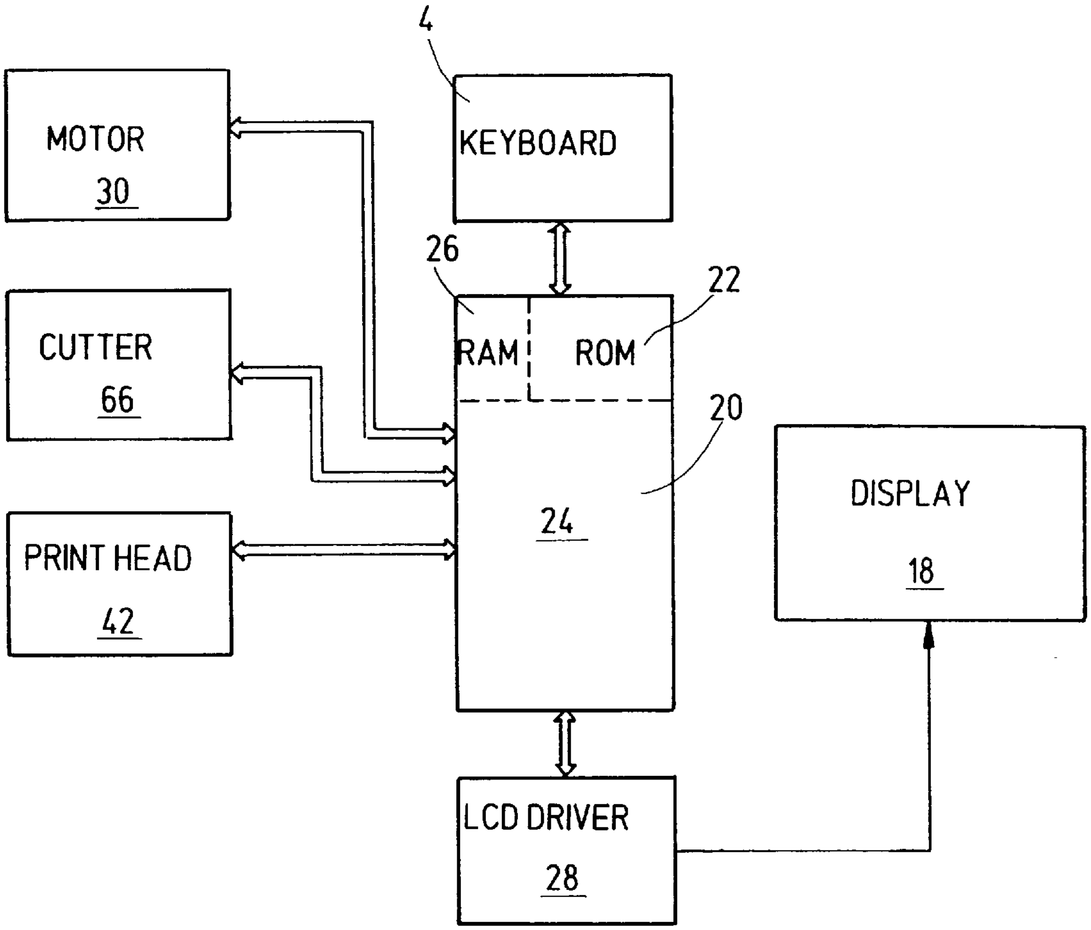
FIG. 3 is a simplified block diagram of control circuitry for controlling the tape printing apparatus of FIG. 1.

As shown in FIG. 3, the platen 44 is driven by a motor 30, for example a dc motor or a stepper motor so that it rotates to drive the image receiving tape 54 in a direction which is parallel to the lengthwise extent of the image receiving tape 54 through the print zone 46. In this way, an image is printed on the image receiving tape 54 and the image receiving tape 54 is fed from the print zone 46 to the cutting location C. The rotation of the platen 44 also causes the ink ribbon 60 to be driven from the ink ribbon supply spool 56, past the print head 42, and to the ink ribbon take up spool 58.

In those embodiments where the motor 30 is a dc motor, the image receiving tape 54 is driven continuously through the print zone 46 during printing. Alternatively, in those embodiments where the motor is a stepper motor, the platen 44 rotates stepwise to drive the image receiving tape 54 in steps through the print zone 46 during the printing operation. However, it should be appreciated that any type of motor operated in any suitable manner can be used with embodiments of the present invention.

The print head 42 is a thermal print head comprising a column of a plurality of printing elements. The print head 42 is preferably only one printing element wide and the column extends in a direction perpendicular to the lengthwise direction of the image receiving tape 54. The height of the column of printing elements is preferably equal to the width of the image receiving tape 54 to be used with the label printing apparatus 2. With embodiments of the present invention where more than one width of image receiving tape 54 is used, the print head column will generally have a height equal to the largest width of image receiving tape 54. An image is printed on the image receiving tape 54 column by column by the print head 42.

In some embodiments the print head 42 may have a height which may be slightly less than the width of the largest image receiving tape which can be used with the tape printing apparatus 2 of the present invention. This is because an image printed on the image receiving tape 54 will tend to have upper and lower blank margins. The print head 42 may then have a height corresponding to the largest width of tape, less the height of the upper and lower margins.

It should be appreciated that an image can be printed on the image receiving tape via the ink ribbon 60. Alternatively if the image receiving tape 54 is of a suitable thermally sensitive material, an image can be applied directly by the print head 42 to the image receiving tape. In this case, no ink ribbon would be required with a thermally sensitive image receiving tape 54.

As an alternative to the two cassette system shown in FIG. 2, the cassette receiving bay 40 may be arranged to receive a single cassette having both the image receiving tape 54 and the ink ribbon 60. Any other suitable arrangement for providing a supply of image receiving tape can of course be used with the present invention.

The basic control circuitry for controlling the tape printing apparatus 2 will now be described in connection with FIG. 3. There is a microprocessor chip 20 having a read only memory (ROM) 22, a microprocessor 24 and random access memory capacity indicated diagrammatically by RAM 26. The microprocessor 24 is controlled by programming stored in the ROM 22 and when so controlled acts as a controller. It should be appreciated that the microprocessor chip can be replaced by a separate microprocessor, a separate ROM and a separate RAM.

The microprocessor chip 20 is connected to receive label data input to it from the keyboard 4. The microprocessor chip 20 outputs data to drive the display 18 via the display driver chip 28 to display a label to be printed, or a part thereof, and/or message or instructions for the user. The display driver 28 may form part of the microprocessor chip 20. Additionally, the microprocessor chip 20 outputs data to drive the print head 42 which prints an image onto the image receiving tape 54 to form a label. Finally, the microprocessor chip 20 also controls the motor 30 for driving the image receiving tape 54 through the tape printing apparatus 2. The microprocessor chip 20 may also control the cutting mechanism 66 to allow lengths of image receiving tape 54 to be cut off after an image has been printed thereon. Alternatively, the cutting mechanism may be manually operable.

The tape printing apparatus 2 of the present invention allows labels to be composed and displayed on the display 18 using the various keys. In particular, the ROM 22 stores information relating to alphanumeric characters and the like which are associated with respective ones of the keys 6 as well as information relating to the functions associated with the function keys 8*a*–8*i*. When a key 6 is depressed, data concerning the associated character or the like is retrieved from the ROM 22 and then stored in the RAM 26. The data stored in the RAM 26 may be in the form of a code which identifies the character. The microprocessor 24, in accordance with the data stored in the RAM 26, generates pixel data which is transmitted in one form column by column to the print head 42 and to the display 18 in another form. It should be appreciated that the displayed image and the printed image may differ only in their resolution in some embodiments of the present invention.

Additionally data concerning a function may be retrieved from the ROM 22 in response to activation of one or more of the function keys 8*a*–8*i*. That data may take the form of one or more flags. The pixel data generated by the microprocessor 24 and sent to the print head 42 and the display 18 will take into account the data relating to one or more functions stored in the RAM 26. As will be appreciated, the function keys 8*a*–8*i* of the keyboard 4 have predetermined functions associated therewith which causes predetermined data associated with that function to be retrieved from the ROM 22 and/or RAM 26. Some of the functions may allow information to be stored into the RAM 26.

As mentioned above, a range of different widths of image receiving tape 54 can be used with the tape printing apparatus 2 embodying the present invention. In a preferred embodiment of the invention, five different widths of image receiving tape 54 are used—6, 12, 19, 24 and 32 mm. However, it is not necessary to provide five different widths for the ink ribbon 60. In particular, two different widths of ink ribbon 60 may be used 19 and 28 mm. The 19 mm ink ribbon 60 can be used with 6, 12 and 19 mm width image receiving tapes 54. The 24 and 32 mm width image receiving tapes 54 can be used with the 28 mm ink ribbon 60. A printed image on the image receiving tape 54 will generally have upper and lower blank margins. Accordingly, the 28 mm ink ribbon 60 still allows a "full" sized image to be printed on the 32 mm width image receiving tape 54. The image would then have, for example, upper and lower margins each of 2 mm height.

Discussions will now be made in relation to the plurality of data entry keys 6 which are used to input an image or message to be printed on the image receiving tape 54 to thereby design a label and the plurality of function keys 8*a*–8*i*. The function associated with each of these keys will be described in turn.

Key 8*a* has two functions associated therewith. Firstly, when the key 8*a* is activated alone and no other keys are activated at the same time, an "escape" function is provided. This key 8*a* allows the user to exit from the menus displayed when any of the keys 8*b*–8*i* are activated to return the display 18 to a state in which the user can enter character data, etc. defining an image to be printed on the image receiving tape 54 and the entered character data or the like is displayed on the display 18. In other words, it allows the user to return to the normal data entry mode in which an image to be printed can be entered. It should be appreciated that if the escape key 8*a* is activated, changes made to the values of any parameters will be ignored and the values of the parameters will revert to the values which were selected immediately before the activation of the function key 8*b*–8*i* concerned and the calling up of the associated menu. Also associated with key 8*a* is a "new" function. When the shift key 6*a* is activated at the same time as key 8*a*, this clears the previously entered message or image so that a new message or image can be input by the user.

Figure 4:
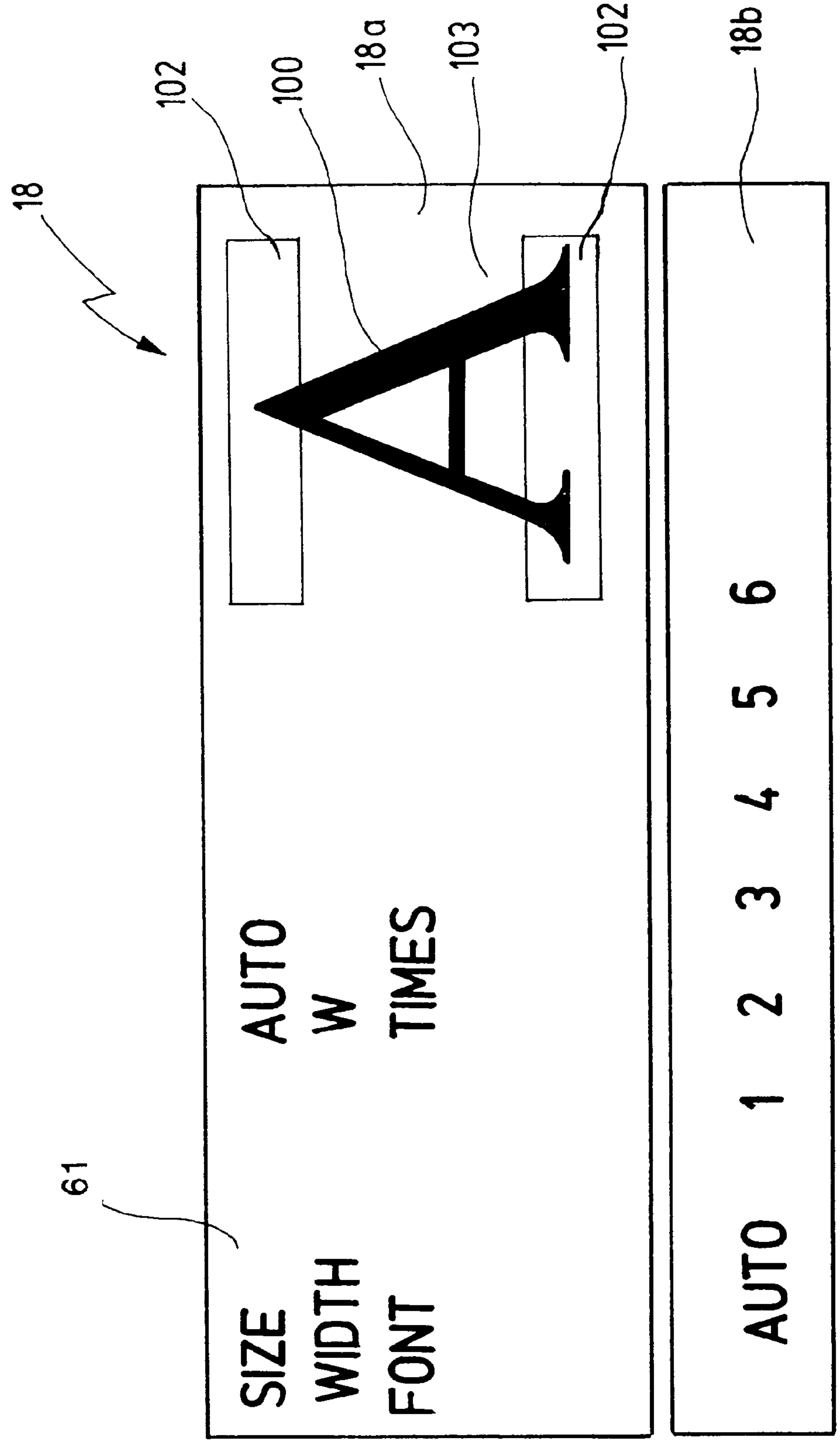
FIG. 4 shows the menu displayed when the size key is actuated.

Key 8*b*, which will be referred to as the size key, allows a user to select the value of three different parameters. In particular, values can be assigned to the character font parameter, character size parameter and character width parameter. When the size key 8*b* is depressed, the menu shown in FIG. 4 is displayed on the display 18. As can be seen from FIG. 4, the display 18 is divided into two sections, 18*a* and 18*b*. In the upper section 18*a*, the three parameters mentioned above and their current user selected values are displayed. We refer first to the size parameter. As can be seen, the size parameter is highlighted by the cursor 61 in FIG. 4 and accordingly, the available size options which can be selected by the user are displayed in the lower section 18*b* of the display 18. The user can change the currently selected size value i.e. AUTO by pressing the select key 62. The current user selected size value will be replaced by the next value displayed in the lower part 18*b* of the display. Thus, on activation of the select key 62, size 1 would be the user selected size and is displayed as such in the upper part 18*a* of the display. As will be appreciated, numbers "1" to "6" represent suitable sizes with "1" being the smallest and "6" being the largest.

Each activation of the select key 62 will cause a different size value to be the currently selected value. The select key 62 is thus activated repeatedly until the desired size value is the user selected size.

It should be appreciated that one of the options for the value of the size parameter is AUTO. When the AUTO value is selected, the character size will be selected in accordance with a user selected tape width, as will be discussed in more detail hereinafter. However in some embodiments of the present invention the character size can be selected in accordance with the actual width of image receiving tape present in the cassette receiving bay 40.

In order to change the value of the width or font parameter, the cursor keys 63 are activated until the width or font parameter respectively is highlighted by the cursor 61. The options or values displayed in the lower part 18*b* of the display 18 will then be the various width or font options available to the user for the highlighted parameter. The currently selected value for the width and font are indicated in the upper part of the display 18 next to the words "width" and "font" respectively. In a similar manner to that outlined in respect of the size parameter, the width or font value can be selected by one or more activations of the select key 62. The font values are "Times" and "Helv" which represent different fonts whilst the width values are represented by three letters "W", each of which has a different width representing different widths of character.

Additionally, on the right hand side of the upper part 18*a* of the display 18 is a sample character 100. The sample character has only the size, font and width values currently selected by the user for the characters to be input by the user and subsequently printed. In other words, the sample character 100 only reflects the values of those parameters which are selectable via this menu. The character displayed is, as mentioned above, a sample character which in the present case is the letter A. However, any other letter or letters may constitute the sample display. In one modification, if the image input by the user, immediately prior to the activation of the size key 8*b* has a plurality of lines, a plurality of sample characters will be displayed. The number of sample characters will correspond to the number of lines and the characters will be arranged one above another. If the size of character selected is too large, then the sample characters may instead be displayed next to one another, reflecting the arrangement of the multiple lines in the input image.

Alternatively, the sample character 100 displayed may be a full WYSIWYG character which means that its appearance on the display 18 is substantially the same as it would appear on the image receiving tape 54 after printing. The sample character would then also reflect the values of parameters which are not selectable via this menu and which are selectable via the other function keys. The only difference between the displayed version of the character and the printed version of the character would be in the resolution thereof as the display tends to have a lower resolution than the printed image.

Additionally, upper and lower bars 102 may also be superimposed over part of the sample character 100 on the display 18. A clear area 103 is provided between those bars 102 and this provides an indication to the user of a user selected width for the image receiving tape. Thus, it is clear to the user when the selected value of the size parameter is such that the character is too large for the user selected width of image receiving tape 54. Alternatively, the bars 102 may reflect the actual width of image receiving tape 54 present in the cassette receiving bay 40. Thus it is clear to the user when the selected value of the size parameter is such that the character is too large for the current width of image receiving tape 54 present in the cassette receiving bay 40. In certain circumstances, the user may intentionally select a character size which is larger (or smaller) than the width of the image receiving tape 54 currently in the cassette receiving bay 40 so that a label for a larger width of the image receiving tape 54 can be stored for later printing on that larger (or smaller) width of the image receiving tape 54.

In order to remove the menu shown in FIG. 4 from the display 18 and confirm the selected values for the size, width and font parameters, the return key 9 is actuated. If the escape key 8*a* is activated as discussed above, then the menu shown in FIG. 4 is removed from the display 18 and the values of the size, width and font parameters revert to those which were selected immediately prior to the actuation of the size key 8*b*.

Figure 5:
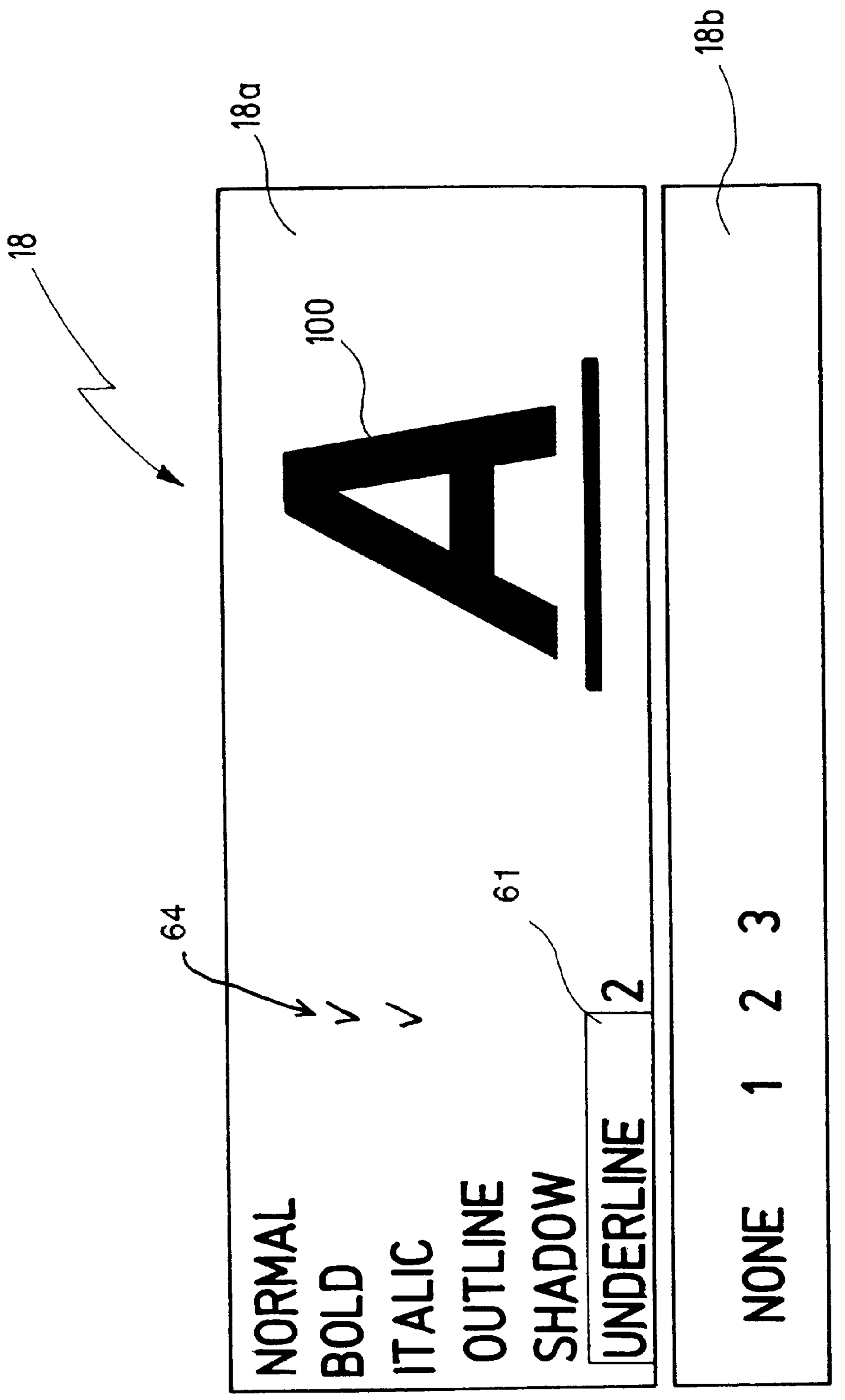
FIG. 5 shows the menu displayed when the style key is actuated.

The third function key 8*c* is the style key 8*c*. The style key 8*c* permits the user to select further attributes of the character to be displayed and printed on the image receiving tape 54. When the style key 8*c* is actuated, the menu shown in FIG. 5 is displayed on the display 18. As with the previous menu, the display is divided into two parts 18*a* and 18*b*. However, unlike the menu displayed in relation to FIG. 4, the lower part 18*b* of the display 18 is clear except when the underlining parameter is highlighted by the cursor 61. The underlining parameter has values of for example NONE, 1, 2 and 3. "NONE" would represent no underlining, "1", the thinnest width of underlining, "2" the medium width of underlining and "3" the thickest width of underlining. These four value options are displayed in section 18*b* of the display when the underlining parameter is highlighted by the cursor 61. In order to change the underlining parameter value currently selected, when that parameter is highlighted by the cursor 61, the select key 62 is activated and this operates in exactly the same way as described in relation to the size key 8*b*. In particular, the next underlining option shown in the lower part 18*b* of the display will be the new user selected option and is therefore displayed in the upper part 18*a* of the display 18. The select key 62 is repeatedly activated until the desired underlining value has been selected and is displayed next to the underlining parameter in the upper part 18*a* of the display 18.

The following parameters are also selectable: normal, bold, italic, outline and shadow. However, these parameters differ from the underlining parameter discussed previously in that they are either selected or not selected. If they are selected, then a tick 64 is provided as for example shown in FIG. 5 next to the bold and italic parameters. If they are not selected, then there is no tick 64 provided next to the parameters as for example shown in FIG. 5 in relation to the normal, outline and shadow parameters. In order to change for example the bold setting, the bold parameter is highlighted by using the cursor keys 63 so that the cursor 61 is over the bold parameter. The select key 62 is then activated to remove the bold setting. if the select key 62 is activated again, then the bold parameter is again selected. With the normal, bold, italics, outline and shadow parameters, it should be appreciated that some of these options are mutually exclusive. For example, if the bold parameter is selected, then the normal parameter cannot be selected. If the bold parameter is on and the normal parameter is subsequently selected, then the bold parameter will no longer be selected. The lower part 18*b* of the display 18 is clear when any of the parameters displayed in the menu of FIG. 5 is highlighted by the cursor 61, except when the previously discussed underline parameter is highlighted by the cursor 61.

As with the previous menu, a WYSIWYG sample character 100 is displayed which has the values of the parameters only of the menu displayed in FIG. 5. Thus, as the user changes the value for any of the parameters displayed in the menu shown in FIG. 5, the character will change to reflect the change in the value of the parameter. In the preferred embodiment of the present invention, the sample character 100 only has the attributes selectable by the menu in which the sample character 100 is included. However, in some embodiments of the present invention, the sample character 100 displayed with the size and style menus will have the attributes which are selected via both of these menus. In other words the displayed sample character would have both the selected style and the size attributes. As described in relation to the size key, a plurality of sample characters may be provided to reflect the number of lines in the input image.

In order to remove the style menu from the display 18, the return key 9 is depressed to confirm the selected values of the parameter and remove the menu from the display. Alternatively, as previously discussed, the escape key 8*a* can be actuated to revert to the previous values of the parameters.

Characters subsequently entered to define an image to be printed will then have the attributes which have been selected via the style key 8*c* and also the size key 8*b*. It is also possible to mark a portion of text and to call up the size and/or style menu. The marked portion of text would then have the new selected size and style parameter values whilst the unmarked text would have the previously selected style and size parameter values. Within the marked text, any subsequently added characters would have the new parameter values whilst outside the marked text any subsequently added character would have the previous parameter values.

Figure 6:
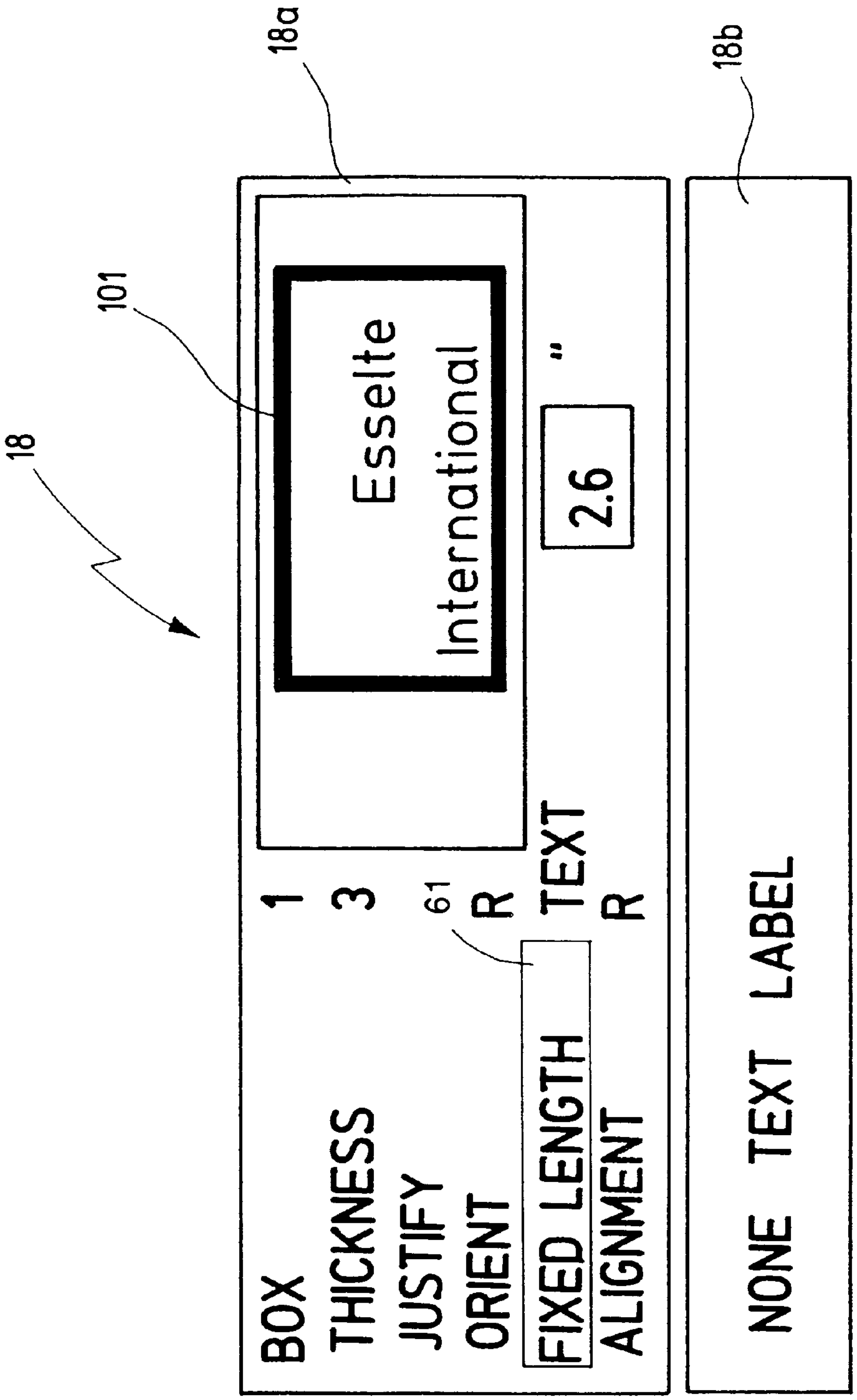
FIG. 6 shows the menu displayed when the layout key is actuated.

Key 8*d* is the layout key. When the layout key 8*d* is activated the menu shown in FIG. 6 is displayed. Once again, the display 18 is divided into two parts 18*a* and 18*b*. As with the style and size menus the first part 18*a* of the display 18 displays the parameters and the currently selected values for those parameters whilst the second part 18*b* of the display 18 displays the options for a given parameter highlighted by the cursor 60. A sample label 101 is also provided in the upper part 18*a* of the display which reflects the values of the layout parameters selected by the user. Thus, if a value of a parameter is altered, the sample label will be modified to reflect the change in value of the parameter. The sample label 101 only reflects the attributes selectable via this menu. However, in another preferred embodiment of the present invention, the sample label may reflect the values of parameters selectable via other menus, for example, the values of the character attribute parameters.

In FIG. 6, the fixed length parameter has been highlighted. The various options available for the fixed length parameter are displayed in the lower part 18*b* of the display 18. A different value for the fixed length parameter can be selected by activating the select key 62 the appropriate number of times. For example, if the fixed length parameter was to have the NONE value, then the select key 62 would be activated twice as the currently selected value for this parameter is the TEXT value, as can be seen from FIG. 6. The TEXT value means that the length of the text in an input label is selected to have a maximum user selected length. The LABEL value means that the label itself is selected to have a predetermined user selected length. The respective user selected length can be selected by using the cursor keys 63 to move the cursor sideways to highlight a value box which appears when the TEXT or LABEL values are selected. The user selected length can be selected using the up and down cursor keys 63 to increment or decrement the value. Alternatively the user selected length can be selected using the numbered keys. The third value NONE is where the label and the text can have any length in dependence on the input image.

In order to change the value of any other parameter, the cursor keys 63 are used so that the desired parameter to be changed is highlighted. For example, if the thickness of the frame or box parameter was to be changed, then the upward cursor key 63 would be activated three times to highlight with the cursor 61 the thickness parameter. The available values or options for the thickness parameter would then be displayed in the lower part 18*b* of the display 18. The thickness parameter refers to the thickness of the lines defining the box and has a range of suitable numerical values.

The box parameter has the values 0, 1, 2 or 3. "0" represents no box, "1" represents a standard rectangular box, "2" represents a standard box with rounded corners, and "3" represents a more ornate type of box.

The justification parameter value can be RIGHT, CENTER, LEFT or OFF. As can be seen from the sample label 101 displayed, the message is right justified with respect to the box. The orientation parameter can have four values, HORIZONTAL, HORIZONTAL and MIRROR, VERTICAL, or VERTICAL and MIRROR with respect to length of the image receiving tape 54. MIRROR means that the image is printed in a mirror image form so that it can be viewed from the opposite side of the image receiving tape 54 to that on which it is printed. The alignment option refers to justification of the label itself as a whole with respect to the tape and has the value R, L, C representing right, left and center justification.

Once a user has selected the desired layout parameters, the return key 9 is activated to confirm the selected values of the parameters and to remove the layout menu from the display 18. The label layout of the existing image, a marked portion of an existing image or a new input image will reflect the selected values for the layout parameters.

Figure 7:
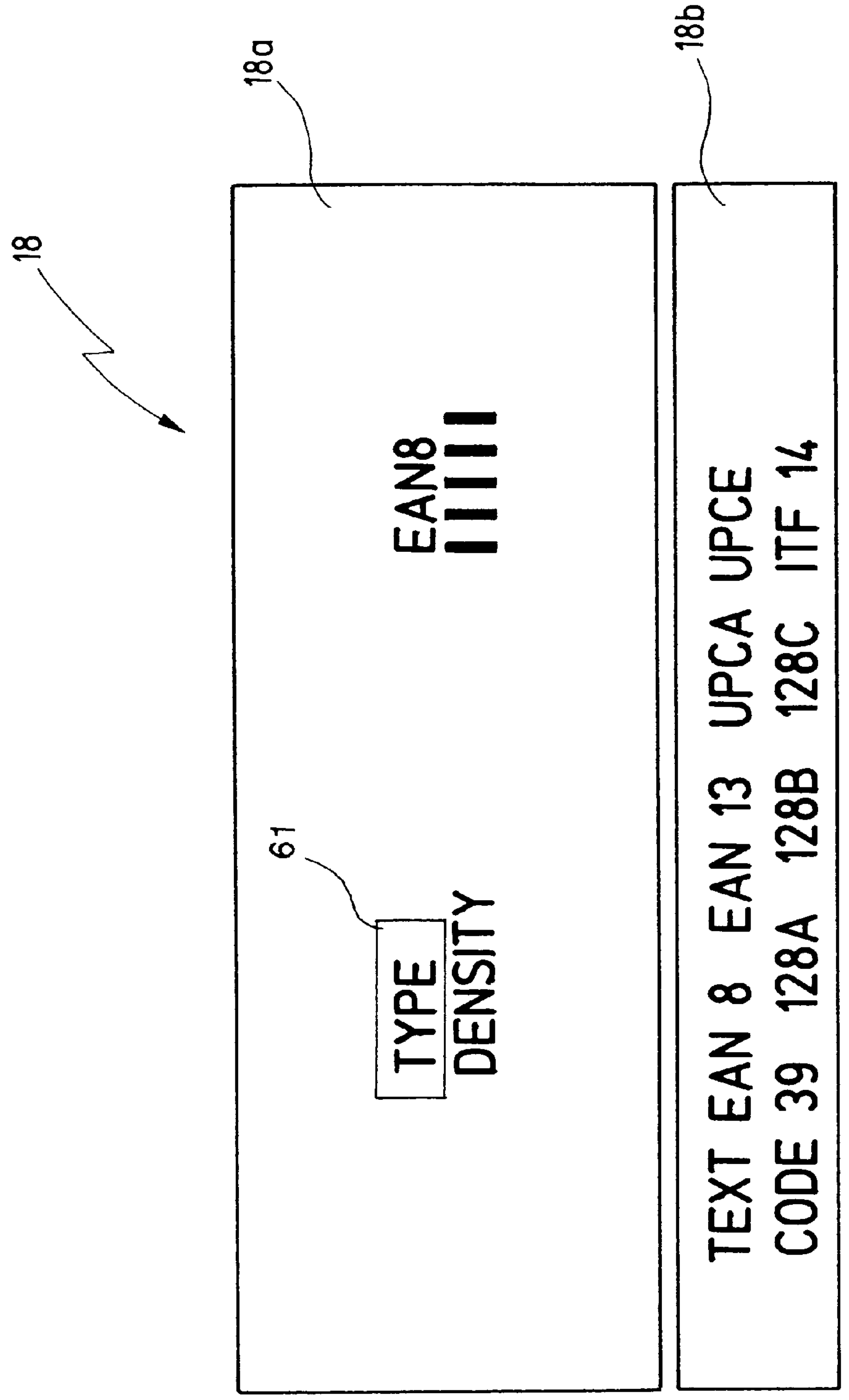
FIG. 7 shows the menu displayed when the bar code key is actuated.

The bar code key 8*e*, when activated causes the menu shown in FIG. 7 to be displayed. This display is again divided into two parts 18*a* and 18*b*. In the top part 18*a* of the display 18, there is once again a list of parameters with their currently selected values. In the second part 18*b* of the display 18 the various options available for the parameter highlighted by the cursor 61 are displayed. The parameter which is highlighted by the cursor 61 can be changed using the cursor keys 63 to move the cursor 61, as discussed in relation to the previous function keys 8*b*, 8*c* or 8*d*. Any of the values available for a given parameter which are displayed in the lower part 18*b* of the display can be selected by activation of the select key 62 the necessary number of times. To confirm the selected values of the parameters and to remove the bar code menu from the display 18, the return key 9 is actuated.

The values of two parameters need to be selected to decide the format of bar codes to be printed. The first parameter is type. The possible options or values for this parameter relate to standard bar code formats and are as follows:

NONE, EAN8, EAN13, UPCA, UPCE, code 39, code 128A, code 128B, code 128C. ITF 14, Interleave of 2 of 5.

The second parameter is the density parameter which can have a low, normal or high value. The selected value for the density parameter is indicated by the thickness of the sample bar code lines next to the word "density". The bar code menu is removed once the user has selected the desired values of the parameters by actuating the return key 9.

Figure 8:
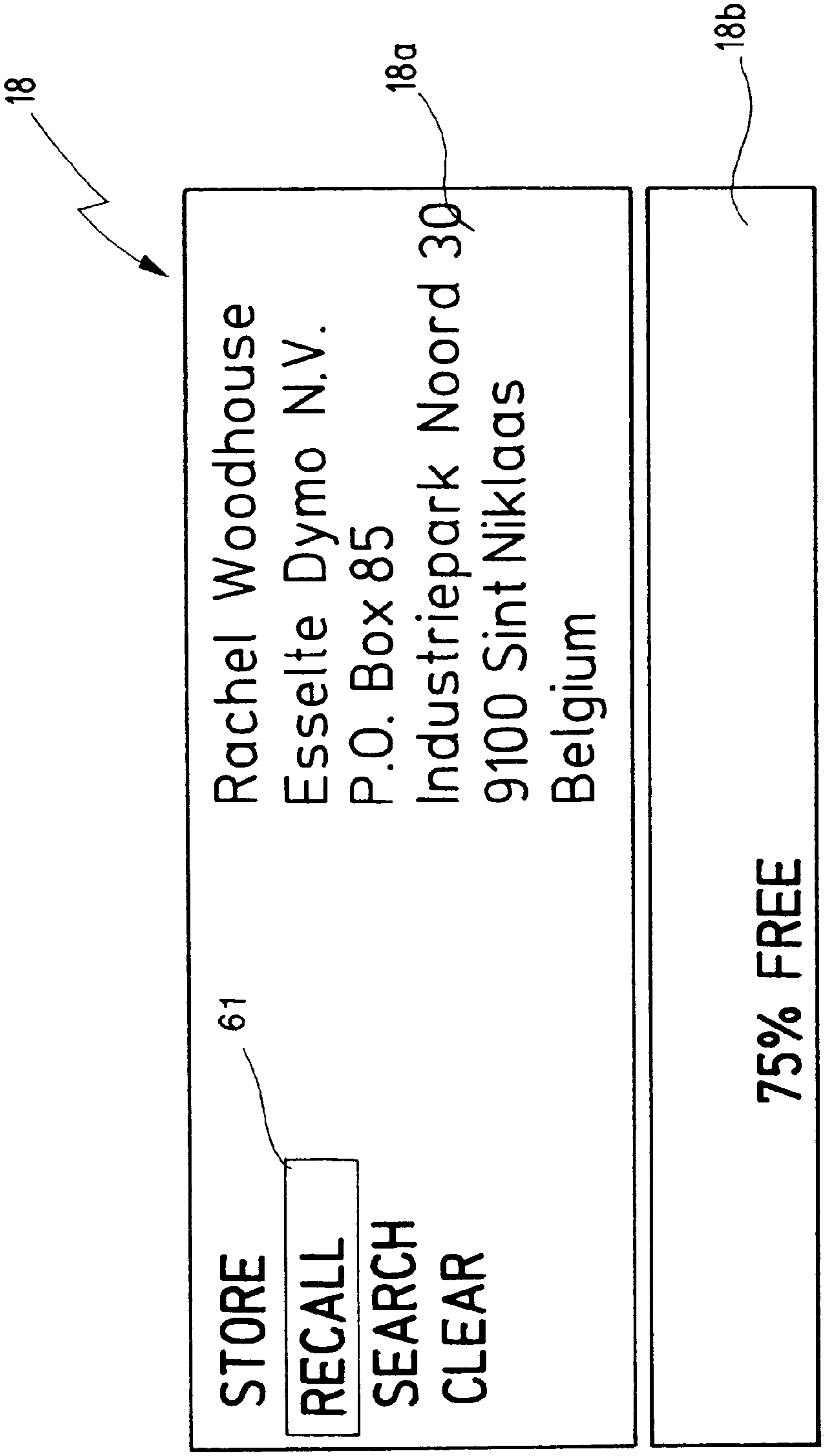
FIG. 8 shows the menu displayed when the memory key is actuated.

The memory function key 8*f*, when activated, causes the menu shown in FIG. 8 to be displayed. There are a number of various functions available via this menu. Firstly, if the STORE option is highlighted by the cursor, then the current label which has been input by the user immediately prior to the activation of the memory key 8*f* will be stored. The CLEAR option, when highlighted by the cursor 61, allows the user to clear a label which is currently displayed in the upper part 18*a* of the display 18 from the memory. The RECALL option allows the user to recall a previously stored label from the memory whilst the SEARCH option allows the user to search for a label previously stored in the memory. In order to select one of these options, the cursor keys 63 are used to highlight, with the cursor 61 the selected option. The lower part 18*b* of the display is used to provide an indication to the user as to the percentage of the memory which is free. This is displayed regardless of which of the four memory parameters has been highlighted by the cursor. To confirm the selection of the values of the parameters and to remove the menu from the display 18, the return key 9 is activated.

Figure 9:
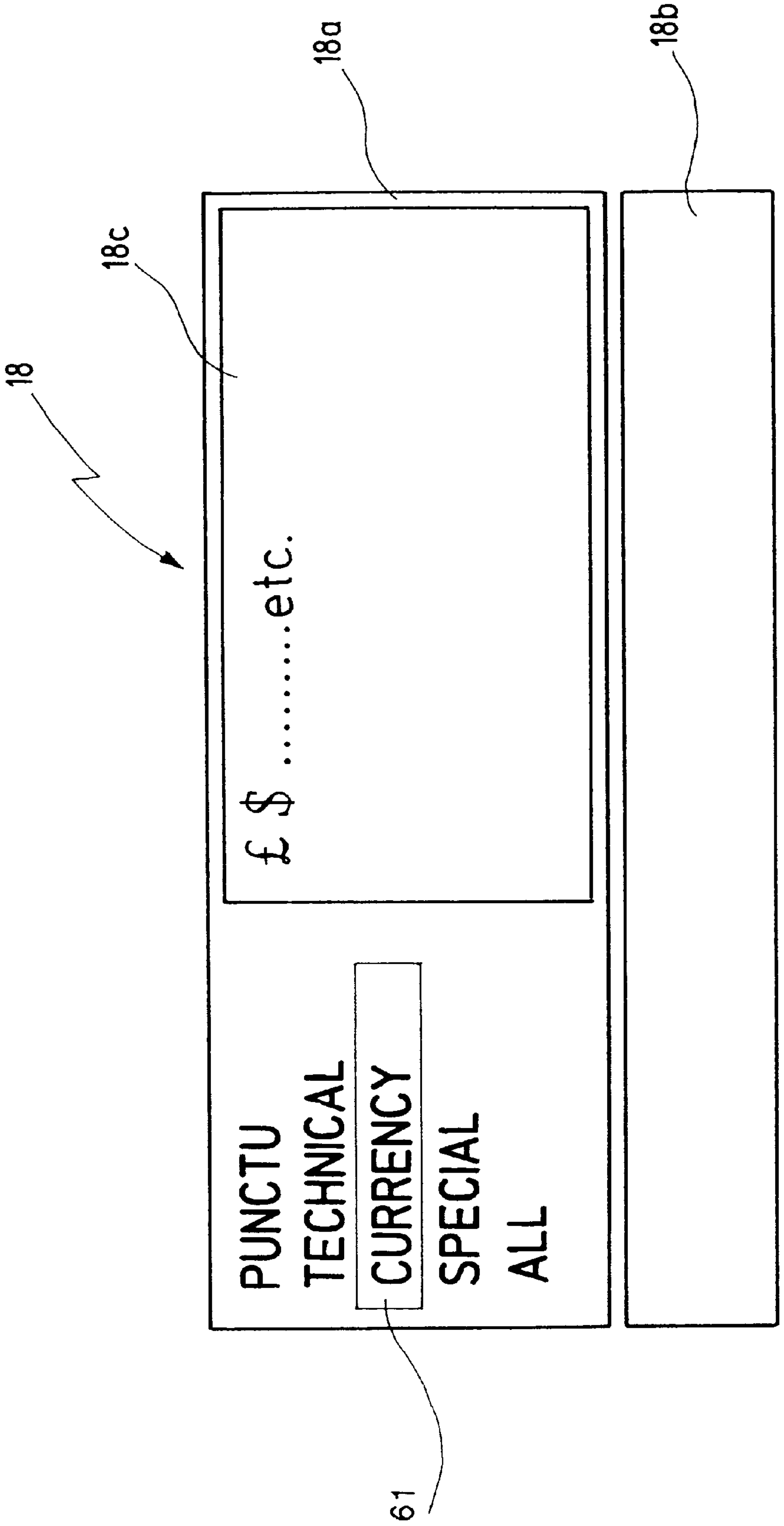
FIG. 9 shows the menu displayed when the symbols key is actuated.

Key 8*g* is the symbol key which allows one or more of a plurality of stored symbols to be inserted into a label. A number of symbols are associated with the symbol key 8*g*. To provide keys for each of these symbols would require a huge number of keys which is impractical. when the symbol key 8*g* is activated, the menu shown in FIG. 9 is displayed. There are a number of options available to the user. The user is able to select one of the displayed options namely ALL, PUNCTUATION, TECHNICAL, CURRENCY or SPECIAL. In order to select one of these options, the cursor keys 63 are activated until the desired option has been highlighted by the cursor 61. When an option is highlighted, the symbols associated with that option are automatically displayed in area 18*c* of the upper part 18*a* of the display. One of the symbols shown in the display area 18*c* can be selected from the displayed symbols by moving the cursor 60 until the cursor 60 is over the selected symbol. The return key 9 is then activated. This removes the symbol menu from the display 18 and causes the highlighted symbol to appear in the image to be printed on the image receiving tape 54.

The ALL option when selected causes all of the symbols to be displayed. As all of the symbols cannot be displayed at the same time on the display, the display may need to be scrolled using the cursor keys 63 in order for the user to check through all of the available symbols. The PUNCTUATION, TECHNICAL, CURRENCY and SPECIAL options are all sub-sets of the ALL option. The PUNCTUATION option selects punctuation marks and the like. The TECHNICAL option selects technical symbols, for example mathematical or scientific symbols. The CURRENCY option selects currency symbols whilst the SPECIAL option selects the remaining symbols. It should be appreciated that with this menu, only the upper part 18*a* of the screen is used. The lower part 18*b* of the screen remains blank at all times with this menu.

In one modification to the present invention, once the cursor 61 is over the selected symbol, the select key 62 is activated. This causes the selected symbol to be displayed in the lower part 18*b* of the screen. The user then moves the cursor to the next symbol to be selected. The select key 62 is then activated again and the second symbol is displayed next to the first selected symbol in the lower part 18*b* of the display 18. This continues until the user has selected all the required symbols. When the return key 9 is activated, all of the selected symbols which are displayed in the lower part 18*b* of the display 18 appear in the image to be printed on the image receiving tape 54 which is also displayed on the display. In a modification of this, only one symbol can be selected at a time so that each time the select key 62 is activated, the currently selected symbol replaces the previously selected symbol.

Figure 10:
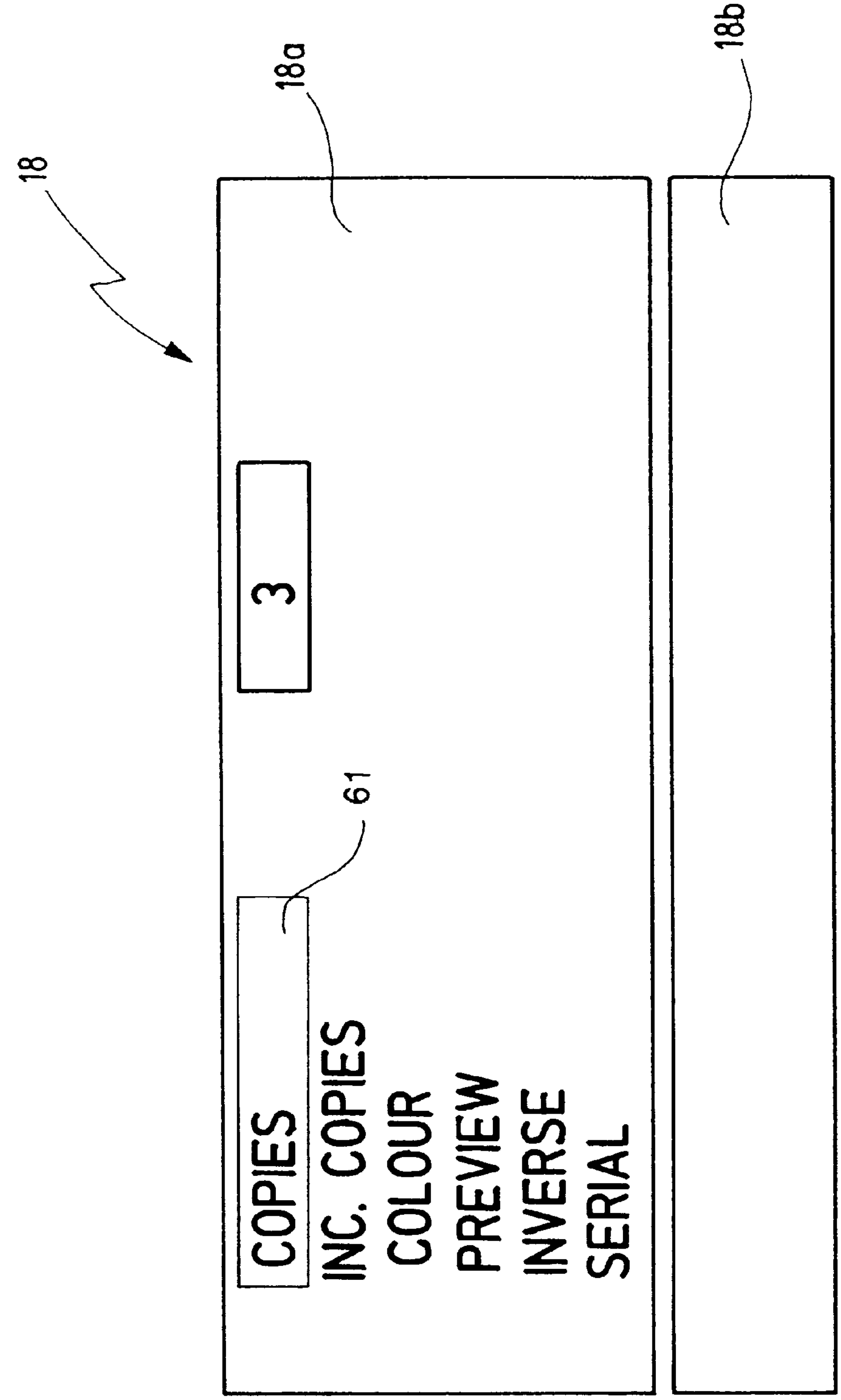
FIG. 10 shows the menu displayed when the special key is actuated.

Function key 8*h* is the special function key. When the special function key 8*h* is activated, the menu shown in FIG. 10 is displayed. There are six parameters which can be set. The first is copies which is the number of copies of a label to be printed. This can be set by the user. When the copies parameter in the upper part 18*a* of the display is highlighted by the cursor 61, the select key 62 or a sidewards cursor key is activated to move the cursor to the copies box. The number in the box can be altered by using repeated activations of the up cursor key to increment the number of copies. Likewise the down cursor key 63 can be used to decrement the number of copies. The select key 62 or a sidewards cursor key is then activated to move the cursor 61 back to the copies parameter, as shown in FIG. 10. In an alternative embodiment, the lower part of the display 18*b* provides a message to the user to the effect that the user should input the desired number of copies using the numbered keys 6. For example, if five copies were required, the user could press the key for numeral 5. Alternatively, when the copies box is highlighted, the user may simply input the number of copies required using the numbered keys 6 without the need for a message to be displayed to the user.

The second parameter which can be set is incremental copies. This means that subsequent copies of the same label will have incremental numbers. For example if the first label has the number 1, then the second label will have the number 2 and so on. When the incremental copies parameter is highlighted by the cursor 61, the user inputs the number of incremental copies required. In a similar manner described above in relation to the copies parameter, the number of incremental copies required can be selected. The microprocessor then determines the number present in the current label and for each subsequent label increments the value of the number by one.

The third parameter is the color parameter which when selected allows different pages (or portions) of a label to be printed in different colors. This necessitates the removal of the cassette 51 holding a supply of ink ribbon of a first color and the replacement of a different ink cassette 51 holding an ink ribbon of a different color. If the color parameter is selected, the print head will be controlled to print only the first page or portion of the image. The print head will then stop printing and a message may be displayed to the user advising the user to change the ink cassette. Once the ink cassette of a different color is inserted, the second portion of the image is then printed in the second color. The color parameter is either selected or not selected. To select the color parameter, the select key 62 is activated. A further activation of the select key 62 will cause the color parameter to be not selected. If the color parameter is selected, then a tick will be provided next to that parameter.

The fourth parameter is the preview parameter which is either selected or not selected, in a similar manner to that outlined in respect of the color parameter. If the preview parameter is selected, the label is reduced to a size such that the entire label can be viewed at one time on the display. Thus, the user can see the relative positioning of the different parts of the label.

The fifth parameter is the inverse parameter which again is either selected or not selected, as outlined above in relation to the color parameter. If the inverse parameter is not selected, then, for example, a black ink ribbon would define an image on, for example, a white image receiving tape such that the text would appear as a black image on a white background. If the inverse parameter is selected, the text would appear as a white image on a black background. In other words, in the inverse mode, those printing elements of the print head which would be off in the non-inverse mode of printing would be on and those printing elements which would be on in the non-inverse printing mode of operation would be off.

The final parameter which can be selected via the special function key 8*h* is the serial parameter. Again, this parameter is selected or not selected. This parameter can be selected in the same way as outlined in relation to the previous parameters of this menu. If the serial parameter is selected, then the tape printing apparatus 2 will be arranged to receive instructions and data from a remote apparatus such as a pc or the like. If the serial parameter is not selected, then the tape printing apparatus 2 cannot be controlled by an external pc or the like.

As with the previous menus, the return key 9 is activated to confirm that selected values of the parameters and to remove the menu from the display 18.

Figure 11:
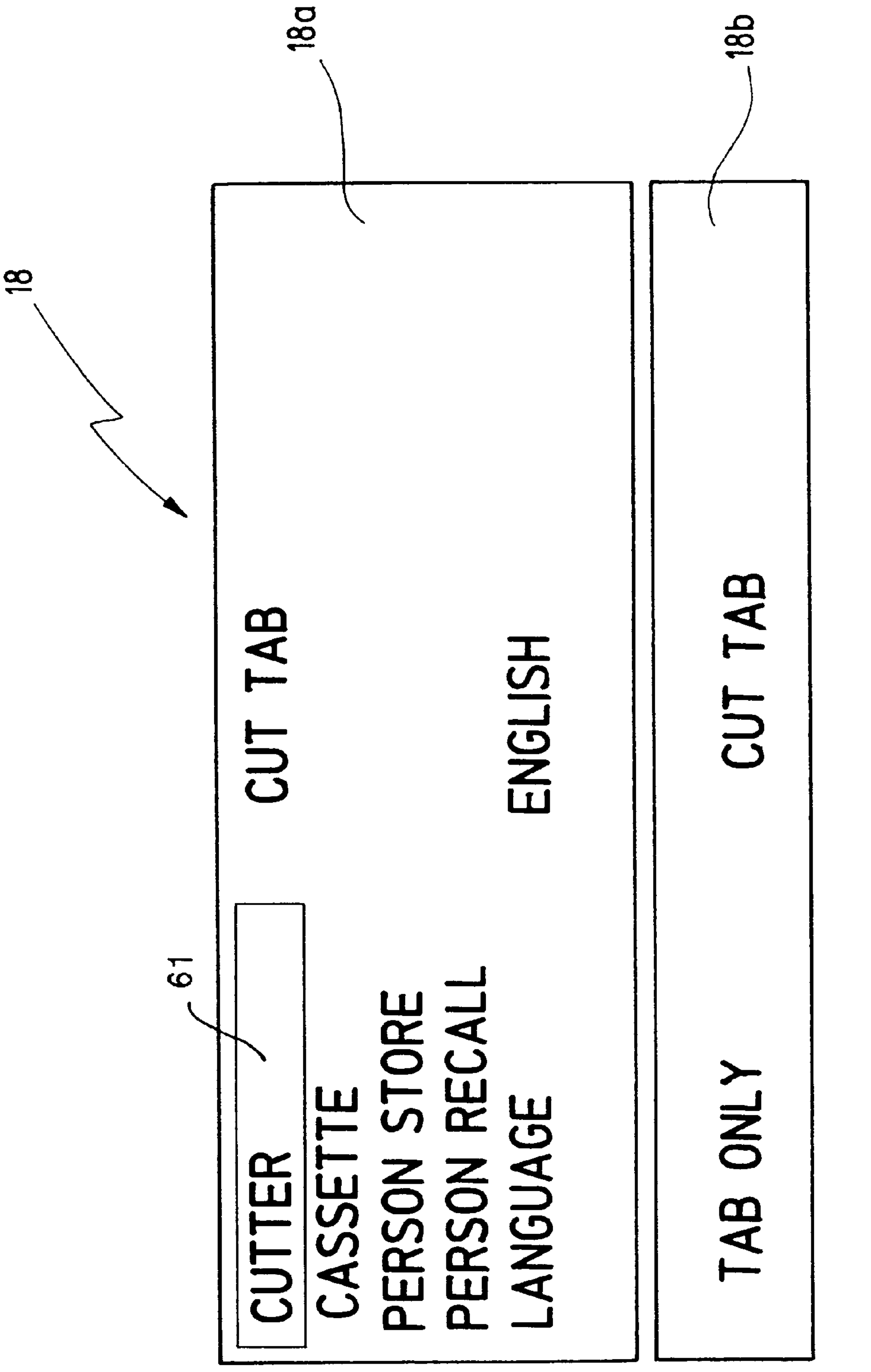
FIG. 11 shows the menu displayed when the set up key is actuated.

Reference will next be made to the set up key 8*i* When the set up key 8*i* is activated, a menu as shown in FIG. 11 is displayed. As with the other functions, the display is divided into two parts 18*a* and 18*b*. The various parameters for which values are to be set are generally indicated in the upper part 18*a* of the display along with the current values of some of those parameters. The various options or values which can be selected for the highlighted parameters may be displayed in the lower part 18*b* of the display 18. There are five parameters to be set in respect of the set up function.

The first parameter is the cutter parameter. The user has two options for this parameter which are displayed in the lower part 18*b* of the display. The first option is for the cutter to provide a cut completely through the tape as well as a tab cut. Alternatively, only a tab cut may be provided. In the latter case, a string of labels would be produced which are separated by a cut extending only through the image receiving layer of the image receiving tape. The backing tape would remain in tact.

Figure 12:
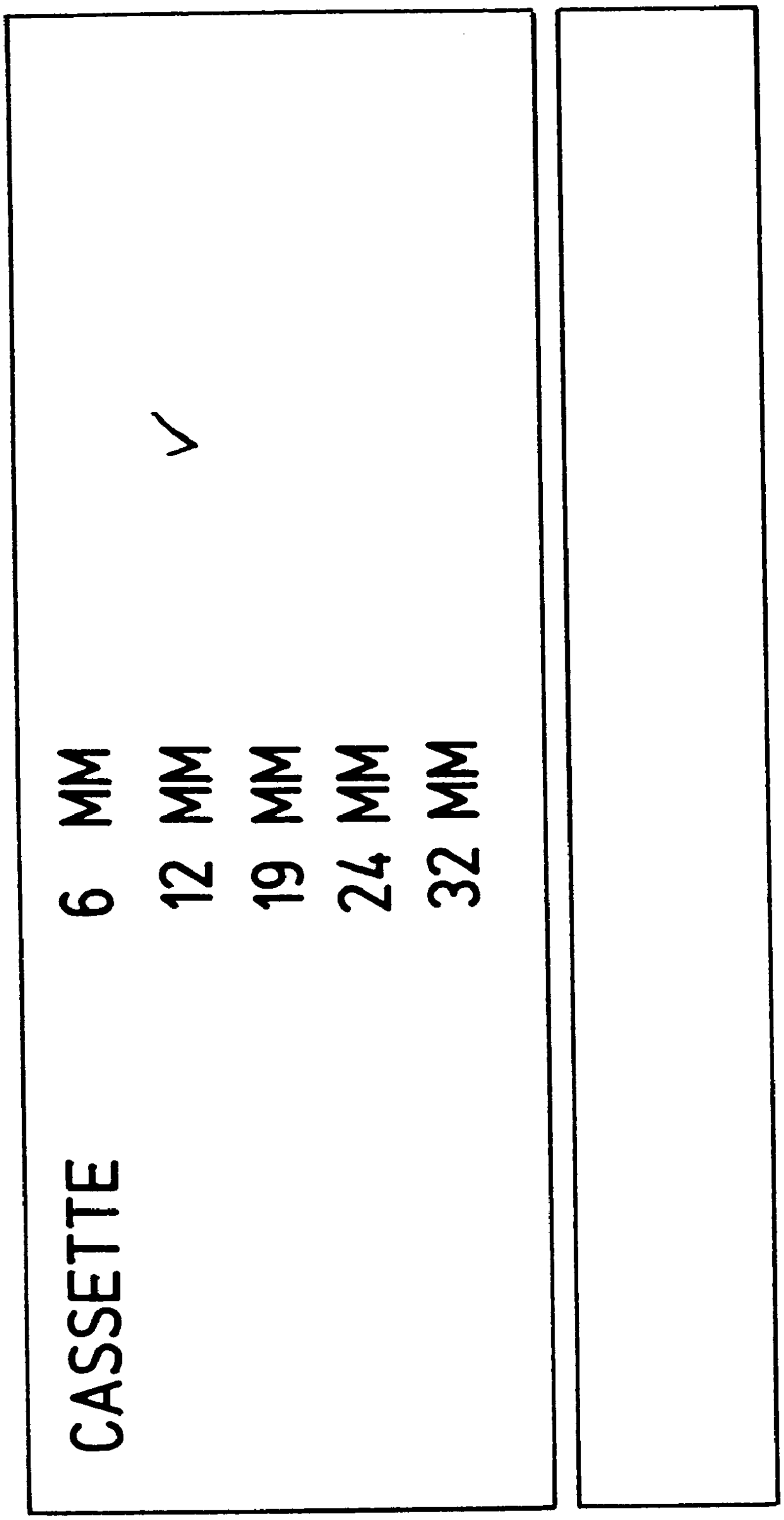
FIG. 12 shows the menu displayed when the cassette parameter of the menu of FIG. 11 is selected.

The second parameter is the cassette parameter which allows the user to select an image receiving tape width independently of the width of image receiving tape 54 received in the cassette receiving bay 40. When the cassette parameter is highlighted by the cursor and the select key 62 activated, the menu shown in FIG. 12 replaces that shown in FIG. 11. On this menu, the five possible image receiving tape widths which can be selected by the user are displayed. Only one of these widths can be selected at one time. In the menu shown in FIG. 12, the user selected image receiving tape width is currently 12 mm. To change the user selected tape width, the cursor is moved until the desired new user selected image receiving tape width is highlighted by the cursor. The select key 62 is then activated to confirm that value as the new user selected tape width and remove the menu shown in FIG. 12 from the display. The menu shown in FIG. 12 will be replaced by that shown in FIG. 11. If alternatively, the escape key 8*a* is activated, the used selected tape width will revert to the previously selected tape width. It should be appreciated that in embodiments of the present invention, a user selected tape width is always selected. However, in other preferred embodiments of the present invention, it is possible to select whether or not a user selected tape width is defined at a given time.

It should be appreciated that the user selected tape width may be selected according to the user's preference and need not be the same as the width of image receiving tape 54 actually received in the cassette receiving bay 40. The user selected tape width allows the user to compose a label for printing on the user selected tape width particularly when the auto size is selected for the character. In other words, when the value auto is selected for the character size via the size key 8*b*, the microprocessor 24 is operable to select the most appropriate character size in accordance with the user selected tape width. That label can then be stored and subsequently printed by the user when the width of the image receiving tape received in the cassette bay 40 is the same as the user selected tape width.

The third and forth parameters are the personalization parameters. The personalization parameters allow a user to select a preferred set of character and/or label attributes and to store those selected attributes for future use. Accordingly, the RECALL parameter, if selected, allows the previously selected character and/or label attributes to be recalled. The input image already input or about to be input by the user will have these characters and/or label attributes. The STORE parameter allows a set of the user selected character and/or label attributes to be stored. It should be appreciated that the STORE and RECALL personalization parameters are either selected or not selected and may be selected in the same manner as outlined in relation to the color parameter of the menu shown in FIG. 10.

The fifth parameter associated with this menu is the language parameter. This refers to the selected language used to convey messages to the user, for example in the various menus described in relation to the function keys 8*b*–8*i*. The various languages available are listed in the lower part 18*b* of display when the language parameter is highlighted and the user can select the desired language in accordance with his own preference. The languages are selected by activating the select key 62 the required number of times, when the language parameter is highlighted by the cursor 61. Thus, a user can change the language as desired. It should be appreciated that the language selected by the user does not effect the keyboard operation. There are a number of different keyboard formats available which tend to differ depending on the language spoken in the country in question. By modifying the messages which are displayed to the user on the display 18 to be in the user selected language, it is possible for a user to be able to easily use a tape printing apparatus 2 which has not been designed for his own language. For example, if the tape printing apparatus 2 is suitable for use in an English language country, a French user can select French as the value of the language parameter and the display will display all the messages to the user in French.

As will be appreciated, all of the function keys 8*b* to 8*i* cause a menu to be displayed which has two parts. The upper part 18*a* generally displays the parameters and the currently selected values for those parameters whilst the lower part 18*b* of the display may display the values available for a parameter highlighted by the cursor 61. The two parts 18*a* and 18*b* of the display are separated by a line across the display. Alternatively the first and second parts 18*a* and 18*b* of the display may be different displays. Thus, the user is unable to affect a value in the lower part of the display but is only able to modify the values in the upper part of the screen. In other words, the user is unable to address or modify the lower part 18*b* of the display when any of the function keys 8*b*–8*i* are activated. Even if there are no values to be displayed in the lower part 18*b* of the display 18, the lower part 18*b* of the display 18 is kept blank.

The microprocessor 24 is arranged to control the LCD driver 28 so that when any of the function keys 8*b*–8*i* is activated, the display is divided into two separate portions. The upper portion 18*a* of the display is controlled by the microprocessor 24 so that the user can address this first part of the display. In contrast, the microprocessor 24 is arranged to control the lower part 18*b* of the display so that the user is unable to address the lower part of the display. It should be appreciated that in the normal (edit) mode of operation in which the user is able to input an image to be printed, the microprocessor 24 is arranged to permit the user to address both the upper and lower parts of the display 18. However, in one modification to the present invention, the user is able to address only the first part of the display in the edit mode of operation to allow an input image to be displayed in the first part 18*a* of the display. The second part of the display may be used to convey information to the user such as the value of certain parameters, messages to the user or the like.

It should also be appreciated that with embodiments of the present invention a single activation of one of the function keys 8*b*–8*i* is all that is required to call up the associated menu. The use of shift keys or the like is not required. Additionally, the menus can also be removed from the display simply by activating the return key 9 which then recalls to the display an image which has previously been input, or if no such image has been input a blank screen. The user is then able to continue or start to input an image to be printed. Alternatively, the previously input image can be modified.

If one of the function keys has been activated and the associated menu is displayed on the display and a further function key is activated, then the menu displayed on the display 18 will be one associated with the most recently activated function key. Thus, the user can switch from function to function without having to press the return key between successive actuation of different function keys thus reducing the number of key operations which are required in order to modify various settings of the tape printing apparatus 2.

Activation of a function key whilst the menu associated with another function key is displayed will cause the values of the currently displayed menu to be confirmed.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A label printer comprising:

a plurality of keys for entering data defining a label image to be printed on an image receiving medium;

a display area for displaying information relating to said label image and including first and second zones;

printing means for printing said label image; and control means for controlling the operation of said label printer to selectively operate in a setup mode and an edit mode, wherein said first zone is adapted to display information responsive to the actuation of at least one of said keys and wherein said second zone is adapted to display, in the setup mode, a set of prestored selectable data corresponding to the information displayed in said first display zone to thereby assist a user in defining a label.

2. A label printer comprising:

a plurality of keys for entering data defining a label image to be printed on an image receiving medium;

a display area for displaying information relating to said label image and including first and second zones;

printing means for printing said label image; and control means for controlling the operation of said label printer to selectively operate in a setup mode and an edit mode, wherein said first zone is adapted to display information responsive to the actuation of at least one of said keys and wherein said second zone is adapted to display, in the setup mode, a set of prestored selectable data corresponding to the information displayed in said first display zone to thereby assist a user in defining a label wherein said keys comprise a plurality of data entry keys for entering character data and a plurality of function keys for entering a setup mode in order to define parameters of entered character data; in the setup mode said first zone displays a plurality of different parameters in relation to a function key actuated and said second zone displays a set of selectable values associated with at least one parameter; and, in the edit mode, said display area displays information relating to character data entered.

3. A label printer of claim 2, wherein, in the edit mode, both the first and second zones display character data entered to define the image to be printed.

4. A label printer of claim 2, wherein in the edit mode, the first zone displays character data defining the image to be printed.

5. A label printer of claim 1, wherein said display area includes a line which divides the first and second zones.

6. A label printer of claim 2 further comprising a select key for selecting a value for a selected parameter.

7. A label printer of claim 2, wherein the control means is arranged so that a function key, when actuated in the setup mode, causes its associated parameters to be displayed in the display area and to replace parameters in relation to a previously actuated function key.

8. A label printer of claim 2, wherein one function key is a symbol key associated with a plurality of symbol parameters, each symbol parameter representing a sub set of related symbols, said symbol key, when actuated, causing its associated symbol parameters to be displayed in the first zone of the display.

9. A label printer of claim 2, wherein one function key is a memory key associated with a plurality of memory parameters, said memory key, when actuated, causing its associated memory parameters to be displayed in the first zone, said second zone being arranged to display information relating to the status of a selected memory parameter.

10. A label printer of claim 9, wherein information relating to the number of labels stored in the memory and the percentage of the memory available is displayed in said second zone.

11. A label printer of claim 2, where said function keys are assigned to said parameters including at least one of the following attributes:

character attributes;

label attributes;

bar code attributes;

cutter attributes;

memory attributes; and printing attributes.

12. A label printer of claim 11, wherein at least one function key causes parameters relating to character and label attributes to be displayed along with a sample character and label with at least one of the selected attributes.

13. A label printer of claim 12, wherein said sample character and label only have the attributes associated with the selected function key.

14. A label printer of claim 12, wherein a currently selected value for each of the plurality of parameters is displayed.

15. A label printer of claim 2 further comprising a movable cursor, said cursor being movable to designate one parameter of the plurality of parameters displayed in the first zone upon the selection to an associated function key, to thereby display a set of prestored selectable values in relation to said parameter.

16. A label printer of claim 2, wherein each set of prestored selectable values in relation to a parameter consists of options more than On and Off.

17. A label printer comprising:

input means for inputting data defining a label image to be printed on an image receiving medium, said input means comprising a plurality of data entry keys for entering character data and a plurality of function keys for use in controlling printing of said character data;

a display area for displaying information relating to a label image to be printed;

printing means for printing said label image; and control means for controlling operation of said label printer to operate selectively in a setup mode and an edit mode, wherein in the setup mode each function key is adapted to cause a plurality of different parameters in relation thereto to be displayed in the display area, each parameter having associated therewith a set of prestored selectable values for defining said parameter, wherein a selected parameter, its associated set of selectable values and a currently selected value for said parameter are simultaneously displayed in the display area; and wherein in the edit mode each data entry key is adapted to cause a character data in relation thereto to be displayed in the display area.

18. A label printer of claim 17, wherein said display area comprises first and second zones; in the setup mode, said first zone is adapted to display said plurality of different parameters in relation to a function key actuated and said second zone is adapted to display said set of prestored selectable values associated with a selected parameter to assist a user in defining a label.

19. A label printer of claim 18, wherein said control means comprises addressing means for selectively addressing the first and second zones to display information relating to said label image.

20. A label printer of claim 17, further comprising a movable cursor, said cursor being movable to select the selectable values for defining said parameter.

21. A label printer comprising:

input means for inputting data defining a label image to be printed on an image receiving medium, said input means comprising a plurality of data entry keys for entering character data and a plurality of function keys which control printing of said character data;

a display area for displaying information relating to a label image to be printed;

printing means for printing said label image; and control means for controlling operation of said label printer and including addressing means for addressing said display area, wherein said display area comprises first and second display zones, each being selectively addressable by said addressing means to display information relating to said label image, said first display zone being addressable to display a plurality of editing options in relation to each function key, and said second display zone being addressable to display prestored selectable data corresponding to each editing option in relation to a function key actuated to thereby assist a user in defining a label.

22. A label printer of claim 21 further comprising a movable cursor to select the presented selectable data corresponding to each editing option in relation to a function key.

* * * * *